(12) United States Patent
Otaka

(10) Patent No.: US 10,965,368 B2
(45) Date of Patent: Mar. 30, 2021

(54) RELAY DEVICE AND COMPUTER-READABLE STORAGE MEDIA

(71) Applicant: HONDA MOTOR CO., LTD., Tokyo (JP)

(72) Inventor: Masaru Otaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/817,652

(22) Filed: Mar. 13, 2020

(65) Prior Publication Data

US 2020/0313761 A1 Oct. 1, 2020

(30) Foreign Application Priority Data

Mar. 29, 2019 (JP) .............................. JP2019-066415

(51) Int. Cl.
| | |
|---|---|
| *H04B 7/26* | (2006.01) |
| *H04B 7/155* | (2006.01) |
| *H04W 16/26* | (2009.01) |
| *H04W 36/30* | (2009.01) |
| *H04W 24/10* | (2009.01) |
| *H04W 36/00* | (2009.01) |
| *H04W 88/04* | (2009.01) |

(52) U.S. Cl.
CPC ........... *H04B 7/2606* (2013.01); *H04B 7/155* (2013.01); *H04W 16/26* (2013.01); *H04W 24/10* (2013.01); *H04W 36/0088* (2013.01); *H04W 36/30* (2013.01); *H04W 88/04* (2013.01)

(58) Field of Classification Search
CPC .... H04B 7/155; H04B 7/2606; H04B 17/318; H04B 7/15
See application file for complete search history.

(56) References Cited

U.S. PATENT DOCUMENTS

| | | | |
|---|---|---|---|
| 2011/0021221 A1 | 1/2011 | Kondo | |
| 2011/0045766 A1* | 2/2011 | Cho | ..................... H04B 7/0691 455/9 |

FOREIGN PATENT DOCUMENTS

JP        2011029988 A        2/2011

* cited by examiner

*Primary Examiner* — Keith Ferguson

(57) ABSTRACT

A relay device is provided for relaying communication between a radio base station and a communication terminal, which includes a relay function management unit to switch on or off a relay function for relaying communication between the radio base station and the communication terminal, and a change command transmission unit to transmit, to the communication terminal, a change command of a handover threshold for the communication terminal which has established a wireless communication connection with the relay device in a case where the relay function management unit switches off the relay function.

16 Claims, 5 Drawing Sheets

RELAY DEVICE AND COMPUTER-READABLE STORAGE MEDIA

The contents of the following Japanese patent application are incorporated herein by reference: 2019-066415 filed in JP on Mar. 29, 2019.

BACKGROUND

1. Technical Field

The present invention relates to a relay device and a computer-readable storage media.

2. Related Art

A mobile relay device that functions as a base station has been known (for example, see Patent Literature 1).

PRIOR ART

Patent Literature

[Patent Literature 1] Japanese Unexamined Patent Publication No. 2011-029988

SUMMARY

It is desirable to provide a technology that can appropriately support the operation of a relay device.

DESCRIPTION OF EXEMPLARY EMBODIMENTS

Hereinafter, the invention will be described through embodiments of the invention, but the following embodiments do not limit the invention according to the claims. In addition, not all combinations of features described in the embodiments are necessarily essential to the solution of the invention.

Figure 1:
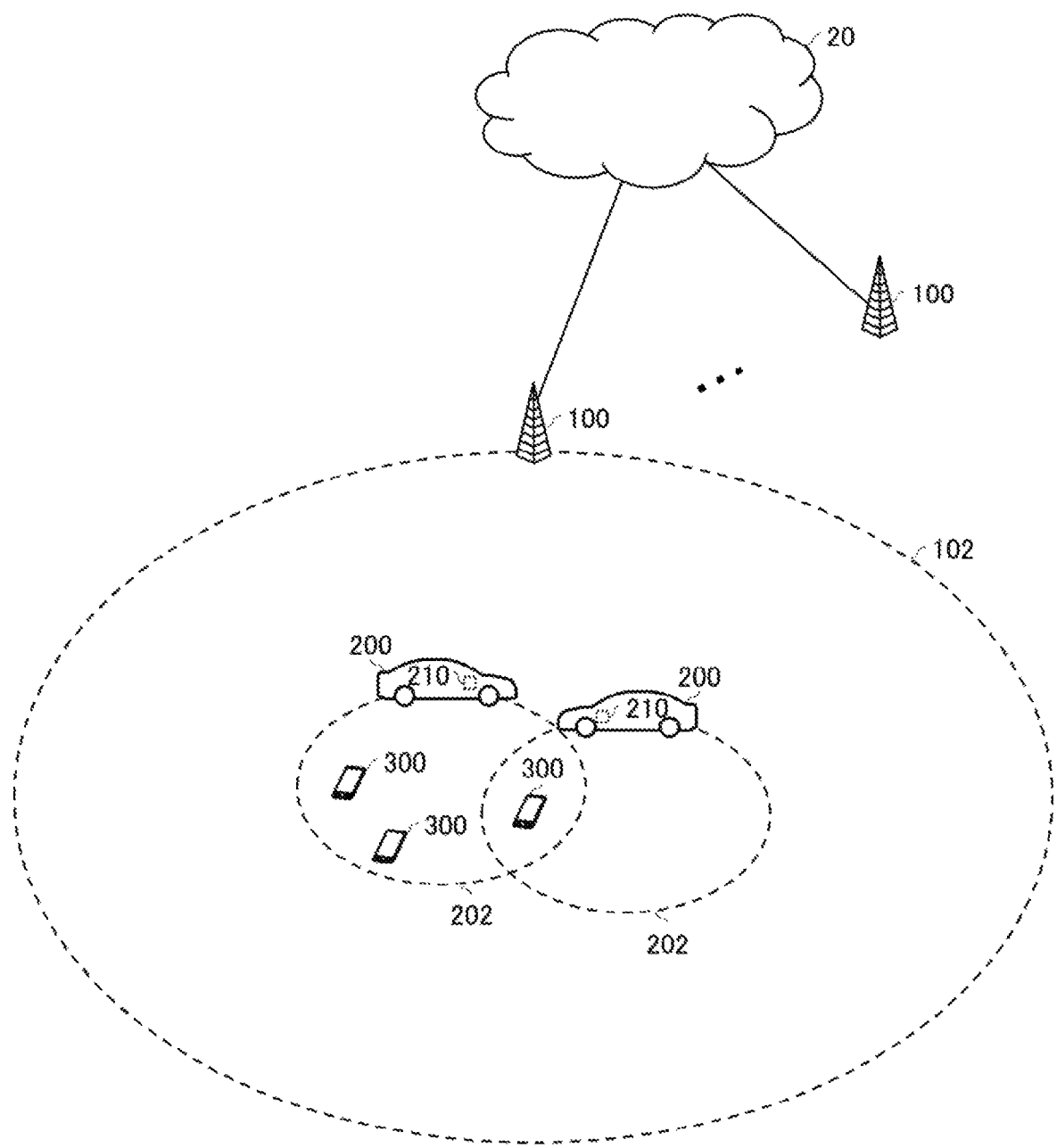
FIG. 1 is a diagram schematically illustrating an example of a communication system 10.

FIG. 1 is a diagram schematically illustrating an example of a communication system 10. The communication system 10 includes a relay device 210 which relays communication between a radio base station 100 and a communication terminal 300. The relay device 210 may be mounted in a moving body. In this embodiment, a case where the relay device 210 is mounted in a vehicle 200 will be described as an example. The vehicle 200 where the relay device 210 is mounted may be called a mobile base station. The communication system 10 may include the vehicle 200. The communication system 10 may include the radio base station 100. As another example of the moving body, there is an unmanned aerial vehicle such as a drone. Further, the relay device 210 may be fixedly installed instead of being mounted in the moving body.

The vehicle 200 may be an automobile. The vehicle 200 may be any kind of automobiles as long as it has a wireless communication function. For example, the vehicle 200 may be a gasoline car, or may be a so-called eco car. The types of the eco car include HV (Hybrid Vehicle), PHEV/PHV (Plug-in Hybrid Vehicle), EV (Electric Vehicle), FCV (Fuel Cell Vehicle), and the like. The vehicle 200 may be an automobile for any use. For example, the vehicle 200 may be a private automobile, or may be a vehicle for business such as a taxi and a bus.

The radio base station 100 may conform to any mobile communication scheme. For example, the radio base station 100 confirms to a 3G (3rd Generation) communication scheme. For example, the radio base station 100 conforms to an LTE (Long Term Evolution) communication scheme. The radio base station 100 may be an eNB (eNodeB). In addition, for example, the radio base station 100 conforms to a 5G (5th Generation) communication scheme. The radio base station 100 may be a gNB (gNodeB). The radio base station 100 may conform to a mobile communication scheme after a 6G (6th Generation) communication scheme. Herein, the description will be mainly given about an example in a case where the radio base station 100 conforms to the LTE communication scheme.

For example, the relay device 210 exists in a wireless communication area 102 which is generated by the radio base station 100, and performs a wireless communication with the radio base station 100. The expression that the relay device 210 exists in the wireless communication area 102 generated by the radio base station 100 may imply that the relay device 210 is located within the wireless communication area 102 and has established a wireless communication connection with the radio base station 100.

For example, the relay device 210 generates a wireless communication area 202, and performs a wireless communication with the communication terminal 300 which exists in the wireless communication area 202. The expression that the communication terminal 300 exists in the wireless communication area 202 may imply that the communication terminal 300 is located within the wireless communication area 202 and has established the wireless communication connection with the vehicle 200. Further, a configuration that the communication terminal 300 exists in the wireless communication area 202 generated by the relay device 210 may be expressed such that the communication terminal 300 exists in the relay device 210.

The mobile communication scheme between the relay device 210 and the communication terminal 300 may be the same as the mobile communication scheme between the relay device 210 and the radio base station 100. In addition, the mobile communication scheme between the relay device 210 and the communication terminal 300 may be different from the mobile communication scheme between the relay device 210 and the radio base station 100.

The communication terminal 300 may be any communication terminal as long as it has a wireless communication function. For example, the communication terminal 300 is a mobile phone such as a smart phone, a tablet terminal, a wearable terminal, and a PC (Personal Computer). In addition, the communication terminal 300 may be an IoT (Internet of Thing) terminal.

The relay device 210 according to this embodiment can switch on or off of a relay function for relaying communication between the radio base station 100 and the communication terminal 300. For example, the relay device 210 switches on or off of the relay function according to an operation by an occupant of the vehicle 200.

In addition, for example, the relay function of the relay device 210 is switched on or off according to an operation state of the vehicle 200. For example, in a case where the vehicle 200 is a vehicle having an engine, and has an OFF state, an ON state of an accessory (this may be referred to as ACC) power, an ON state of an ignition (this may be referred to as IG) power, and an ON state of the engine, and when the IG power is turned on, the relay function of the relay device 210 is turned on. When the IG power is turned off, the relay function of the relay device 210 is turned off. In addition, for example, when the engine is turned on, the relay function of the relay device 210 is turned on. When the engine is turned off, the relay function of the relay device 210 is turned off. Further, when the ACC power is turned on, the relay function of the relay device 210 may be turned on. When the ACC power is turned off, the relay function of the relay device 210 may be turned off.

In addition, for example, in a case where the vehicle 200 is an electric automobile, and has the OFF state, an ACC state in which a part of electric equipment becomes usable, an ON state in which all the electric equipment becomes usable, and a travel-enabled state, and when the vehicle enters the ON state, the relay function of the relay device 210 is turned on. When the state is switched from the ON state to the ACC state or the OFF state, the relay function of the relay device 210 is turned off. In addition, for example, when the vehicle enters the travel-enabled state, the relay function of the relay device 210 is turned on. When the state is switched from the travel-enabled state to the ON state, the ACC state, or the OFF state, the relay function of the relay device 210 is turned off.

In addition, for example, in a case where the vehicle 200 is an electric automobile, and has the OFF state, a power ON state, and the travel-enabled state, and when the vehicle enters the power ON state, the relay function of the relay device 210 is turned on. When the state is switched from the power ON state to the OFF state, the relay function of the relay device 210 is turned off. In addition, for example, when the vehicle enters the travel-enabled state, the relay function of the relay device 210 is turned on. When the state is switched from the travel-enabled state to the power ON state or the OFF state, the relay function of the relay device 210 is turned off.

If the relay function of the relay device 210 is switched off in a state where the communication terminal 300 exists in the relay device 210, the wireless communication connection of the communication terminal 300 is disconnected. In a case where a plurality of communication terminals 300 exist in the relay device 210, reconnection occurs frequently.

In a case where the relay function is turned off, the relay device 210 according to this embodiment performs a process, in which the communication terminal 300 existing in the relay device 210 is induced to exist in another relay device 210 or the radio base station 100 before the relay function is turned off. The relay device 210 gradually reduces the intensity of an output radio wave from an antenna, which is used for forming the wireless communication area 202, in a case where the relay function is switched to be turned off.

For example, the relay device 210 may gradually reduce the intensity of the output radio wave from the antenna until receiving information, indicating that the communication terminal 300 requests a handover from the relay device 210, from the communication terminal 300 which exists in the relay device 210. For example, the information indicating that the communication terminal 300 requests a handover from the relay device 210 may be a measurement report of the radio wave received by the communication terminal 300. The measurement report may be a so-called Measurement Report (this may be referred to as MR).

The relay device 210 gradually reduces the intensity of the output radio wave from the antenna so as to gradually reduce a radio wave reception intensity from the relay device 210 of the communication terminal 300. Therefore, at a certain timing, the radio wave reception intensity from the relay device 210 becomes lower than a handover threshold which is set in the relay device 210, and the measurement report is transmitted from the communication terminal 300 to the relay device 210. The handover threshold may be a handover threshold for determining whether the radio wave reception intensity from a serving cell is lower than the handover threshold. As a specific example, the handover threshold may be a handover threshold in an event A2. In addition, the handover threshold may be a handover threshold for comparison with the radio wave reception intensity from the serving cell in an event A5.

With the configuration that the relay device 210 gradually reduces the intensity of the output radio wave from the antenna, the communication terminal 300 can have an additional time for handover compared to the case of quickly reducing. With this configuration, the communication terminal 300 can be handed over from the relay device 210 in an early stage while reducing a possibility that the wireless communication connection is disconnected in the communication terminal 300 existing in the relay device 210.

The relay device 210 may switch off the relay function after the communication terminal 300 is handed over from the relay device 210. With this configuration, it is possible to suppress a situation that the wireless communication connection of the communication terminal 300 existing in the relay device 210 is disconnected when the relay device 210 switches off the relay function, and the reconnection occurs frequently.

Figure 2:
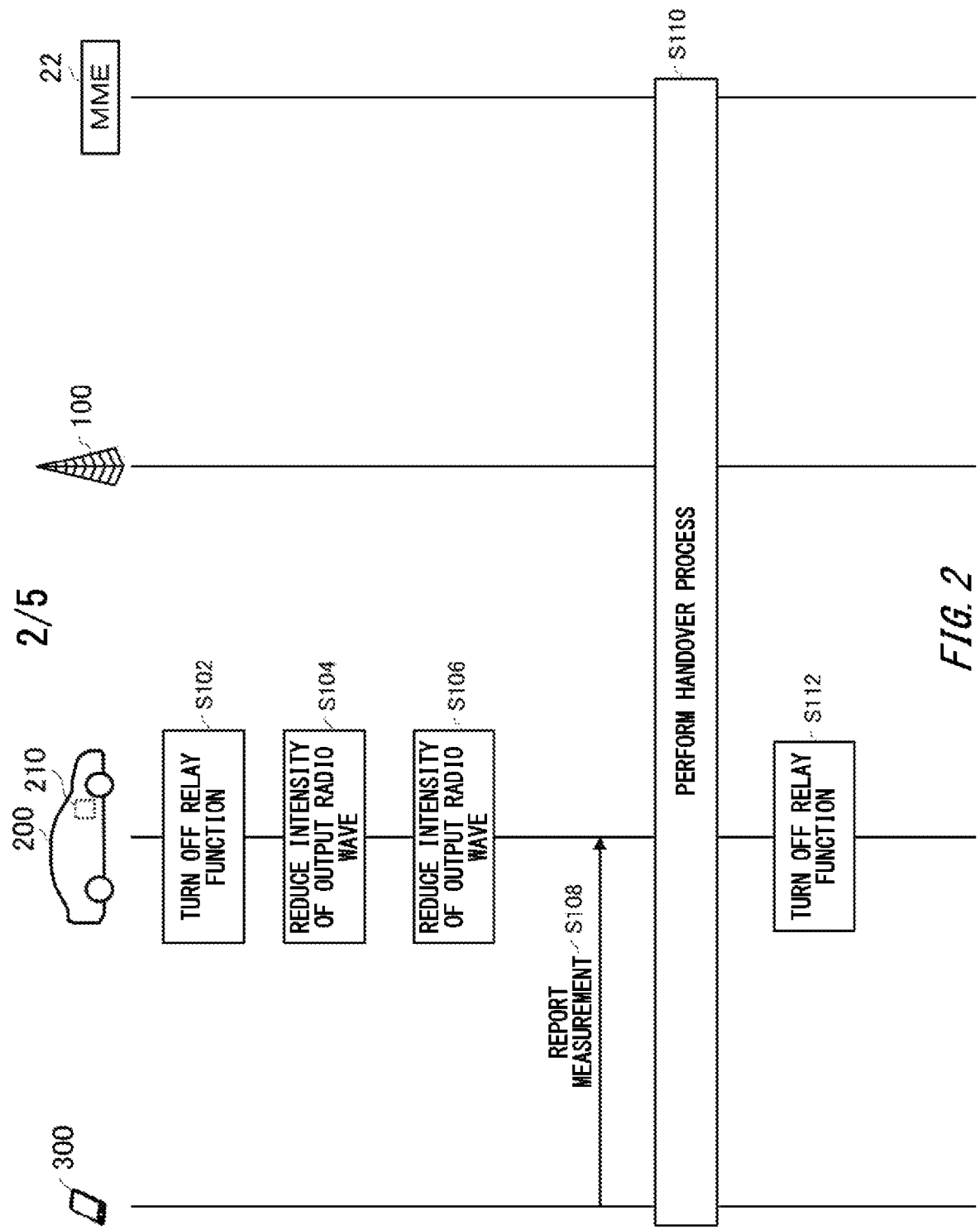
FIG. 2 is a diagram schematically illustrating an example of a processing flow in the communication system 10.

FIG. 2 is a diagram schematically illustrating an example of a processing flow in the communication system 10. Herein, the description will be given about a processing flow in a case where the relay device 210 turns off the relay function in a situation that the communication terminal 300 exists in the relay device 210. Further, the communication terminal 300 is assumed to appropriately measure the radio wave reception intensity from the relay device 210.

In Step (Step may be abbreviated as S) 102, the relay device 210 receives an OFF operation of the relay function from an occupant of the vehicle 200. In S104, the relay device 210 reduces the intensity of the output radio wave from the antenna which is used for the wireless communication with the communication terminal 300. A reduction amount of intensity may be set in advance, or may be changed.

In S106, the relay device 210 reduces the intensity of the output radio wave from the antenna which is used for the wireless communication with the communication terminal 300. The time from S104 to S106 may be set in advance, or may be changed.

In S108, the communication terminal 300 transmits a measurement report to the relay device 210 as the radio wave reception intensity from the relay device 210 becomes lower than a predetermined handover threshold. The measurement report may be a so-called Measurement Report.

In S110, a handover process is performed so that the communication terminal 300 is handed over. For example, the communication terminal 300 exists in the radio base station 100 where the relay device 210 exists or a relay device 210 which is different from the relay device 210.

Any scheme may be employed for the scheme of the handover process. For example, the handover process is an X2 handover. In this case, the relay device 210 which has received the measurement report in S110 determines a handover destination of the communication terminal 300, transmits a handover request to the handover destination, and transmits a handover command to the communication terminal 300. The relay device 210 transmits terminal information of the communication terminal 300 to the handover destination through an X2 interface, and performs a synchronization process between the communication terminal 300 and the handover destination. In addition, a switching request for pass is transmitted from the handover destination to an MME (Mobility Management Entity) 22 in a core network 20, and the MME 22 notifies the core side of the handover destination. Then, the switching for pass is performed by the core side, and the handover is completed. Further, the handover process may be an Si handover.

In S112, after the handover of the communication terminal 300 is completed, the relay device 210 turns off the relay function.

Figure 3:
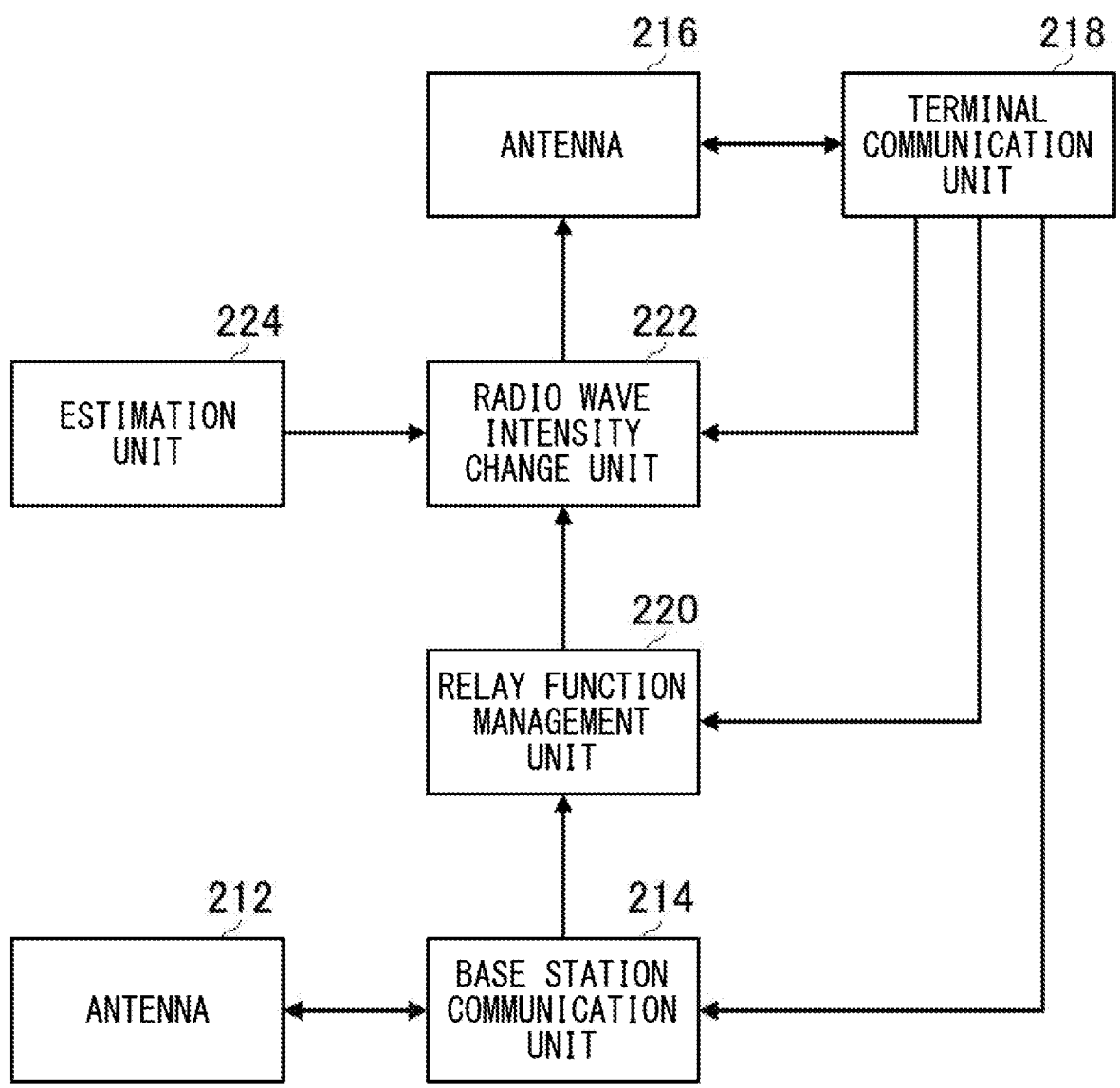
FIG. 3 is a diagram schematically illustrating an example of a functional configuration of a relay device 210.

FIG. 3 is a diagram schematically illustrating an example of a functional configuration of the relay device 210. The relay device 210 includes an antenna 212, a base station communication unit 214, an antenna 216, a terminal communication unit 218, a relay function management unit 220, a radio wave intensity change unit 222, and an estimation unit 224. Further, it is not always necessary for the relay device 210 to have all these configurations.

The antenna 212 is an antenna for wireless communication with the radio base station 100. The base station communication unit 214 performs wireless communication with the radio base station 100 by the output radio wave from the antenna 212 and a received radio wave of the antenna 212.

The antenna 216 is an antenna for wireless communication with the communication terminal 300. The terminal communication unit 218 performs wireless communication with the communication terminal 300 by the output radio wave from the antenna 216 and a received radio wave of the antenna 216.

The relay function management unit 220 manages a relay function for relaying the communication between the radio base station 100 and the communication terminal 300. The relay function management unit 220 may switch on or off of the relay function.

For example, the relay function management unit 220 switches on or off of the relay function according to an operation on the relay device 210. For example, the relay function management unit 220 switches on or off of the relay function according to an operation of an occupant of the vehicle 200 where the relay device 210 is mounted in. In addition, for example, the relay function management unit 220 switches on or off of the relay function according to a state of the moving body where the relay device 210 is mounted in.

In a case where the relay device 210 is mounted in the vehicle 200 which includes the engine, the relay function management unit 220 turns on the relay function, for example, when the IG power is turned on. The relay function management unit 220 may turn on the relay function when the engine is turned on. The relay function management unit 220 may turn on the relay function when the ACC power is turned on.

The relay function management unit 220 may turn off the relay function when the IG power is turned off. The relay function management unit 220 may turn off the relay function when the engine is turned off. The relay function management unit 220 may turn off the relay function when the ACC power is turned off.

In a case where the relay device 210 is mounted in an electric automobile which has the OFF state, the ACC state, the ON state, and the travel-enabled state, the relay function management unit 220 turns on the relay function, for example, when the state becomes the ON state. The relay function management unit 220 may turn on the relay function when the state becomes the travel-enabled state. The relay function management unit 220 may turn on the relay function when the state becomes the ACC state. The relay function management unit 220 may turn off the relay function when the state is switched from the ON state to the ACC state or the OFF state. The relay function management unit 220 may turn off the relay function when the state is switched from the travel-enabled state to the ON state, the ACC state, or the OFF state. The relay function management unit 220 may turn off the relay function when the state is switched from the ACC state to the OFF state.

In a case where the relay device 210 is mounted in an electric automobile which has the OFF state, the power ON state, and the travel-enabled state, the relay function management unit 220 may turn on the relay function when the state becomes the power ON state. The relay function management unit 220 may turn on the relay function when the state becomes the travel-enabled state. The relay function management unit 220 may turn off the relay function when the state is switched from the power ON state to the OFF state. The relay function management unit 220 may turn off the relay function when the state is switched from the travel-enabled state to the power ON state or the OFF state.

In a case where the relay function management unit 220 switches off the relay function, the radio wave intensity change unit 222 gradually reduces the intensity of the output radio wave from the antenna 216. The radio wave intensity change unit 222 may gradually reduce the intensity of the output radio wave from the antenna 216 until receiving information, which indicates a request of the communication terminal 300 for a handover from the relay device 210, from the communication terminal 300 which exists in the relay device 210. The radio wave intensity change unit 222 may gradually reduce the intensity of the output radio wave from the antenna 216 until receiving the measurement report of the radio wave received by the communication terminal 300 from the communication terminal 300 which exists in the relay device 210.

A time interval when the intensity of the output radio wave from the antenna 216 is gradually reduced may be set in advance, or may be changed. A gradual reduction amount of each stage in a case where the intensity of the output radio wave from the antenna 216 is gradually reduced may also be set in advance, or may be changed.

The radio wave intensity change unit 222 may increase the reduction amount of each stage in a case where the intensity of the output radio wave from the antenna 216 is gradually reduced as the radio wave reception intensity from the communication terminal 300 existing in the relay device 210 is higher. For example, the radio wave intensity change unit 222 specifies the lowest radio wave reception intensity among the radio wave reception intensities of the plurality of communication terminals 300 existing in the relay device 210, and increases the reduction amount of each stage in a case where the intensity of the output radio wave from the antenna 216 is gradually reduced as the specified radio wave reception intensity is higher. As the specified radio wave reception intensity is higher, the communication terminal 300 existing in the relay device 210 is located near the relay device 210. Therefore, if the reduction amount of each stage is less, it requires a long time until the communication terminal 300 is handed over. On the contrary, if the reduction amount of each stage is increased, it is possible to shorten a time until the communication terminal 300 is handed over.

The radio wave intensity change unit 222 may specify the lowest radio wave reception intensity among the radio wave reception intensities of the plurality of communication terminals 300 existing in the relay device 210, and lower the reduction amount of each stage in a case where the intensity of the output radio wave from the antenna 216 is gradually reduced as the specified radio wave reception intensity is lower. As the specified radio wave reception intensity is lower, the communication terminal 300 existing in the relay device 210 is located away from the relay device 210. Therefore, if the reduction amount of each stage is large, the wireless communication connection between the relay device 210 and the communication terminal 300 may be disconnected before the communication terminal 300 is handed over. On the contrary, if the reduction amount of each stage is set to small, it is possible to suppress that such a situation occurs.

The relay function management unit 220 may switch off the relay function after the radio wave intensity change unit 222 reduces the intensity of the output radio wave from the antenna 216 and then the communication terminal 300 is handed over from the relay device 210. The relay function management unit 220 may turn off the relay function after the radio wave intensity change unit 222 reduces the intensity of the output radio wave from the antenna 216 and then all the communication terminals 300 existing in the relay device 210 are handed over from the relay device 210.

During a period when the relay function is turned on, the estimation unit 224 monitors a state of the moving body where the relay device 210 is mounted to estimate whether the relay function is to be turned off. For example, in a case where a moving speed of the moving body satisfies a predetermined condition, the estimation unit 224 estimates that the relay function is to be turned off In addition, for example, in a case where the moving speed of the moving body is slower than a predetermined speed, the estimation unit 224 estimates that the relay function is to be turned off.

For example, in a case where the relay device 210 is mounted in the vehicle 200, the estimation unit 224 estimates the relay function is to be turned off in a case where a running speed of the vehicle 200 satisfies a predetermined condition. For example, the estimation unit 224 monitors a change in the running speed of the vehicle 200. In a case where it is determined that the probability that the vehicle 200 is parked is high, it is estimated that the relay function is to be turned off. A relation between the change in the running speed and whether the vehicle 200 is parked is derived by, for example, a machine learning on a number of pieces of data indicating the change in the running speed and whether the vehicle 200 is parked.

In addition, in a case where the running speed of the vehicle 200 is slower than a predetermined speed, the estimation unit 224 estimates that the relay function is to be turned off. In a case where the running speed of the vehicle 200 is slower than a predetermined speed, it is highly probable that the vehicle 200 is parked as it is, and the engine and the power are turned off. It can be said that the relay function is highly likely to be turned off.

In a case where a power OFF operation of the moving body is detected, the estimation unit 224 estimates that the relay function is to be turned off. In this case, for example, in a case where the power OFF operation is performed, the moving body may be configured to turn off the power after the communication terminal 300 existing in the relay device 210 is handed over.

In a case where the relay device 210 is mounted in the vehicle 200, the estimation unit 224 may estimate that the relay function is to be turned off in a case where an ignition OFF operation of the vehicle 200 is detected. In addition, in case where the engine OFF operation of the vehicle 200 is detected, the estimation unit 224 may estimate that the relay function is to be turned off.

When the estimation unit 224 estimates that the relay function is to be turned off, the radio wave intensity change unit 222 may gradually reduce the intensity of the output radio wave from the antenna 216.

Figure 4:
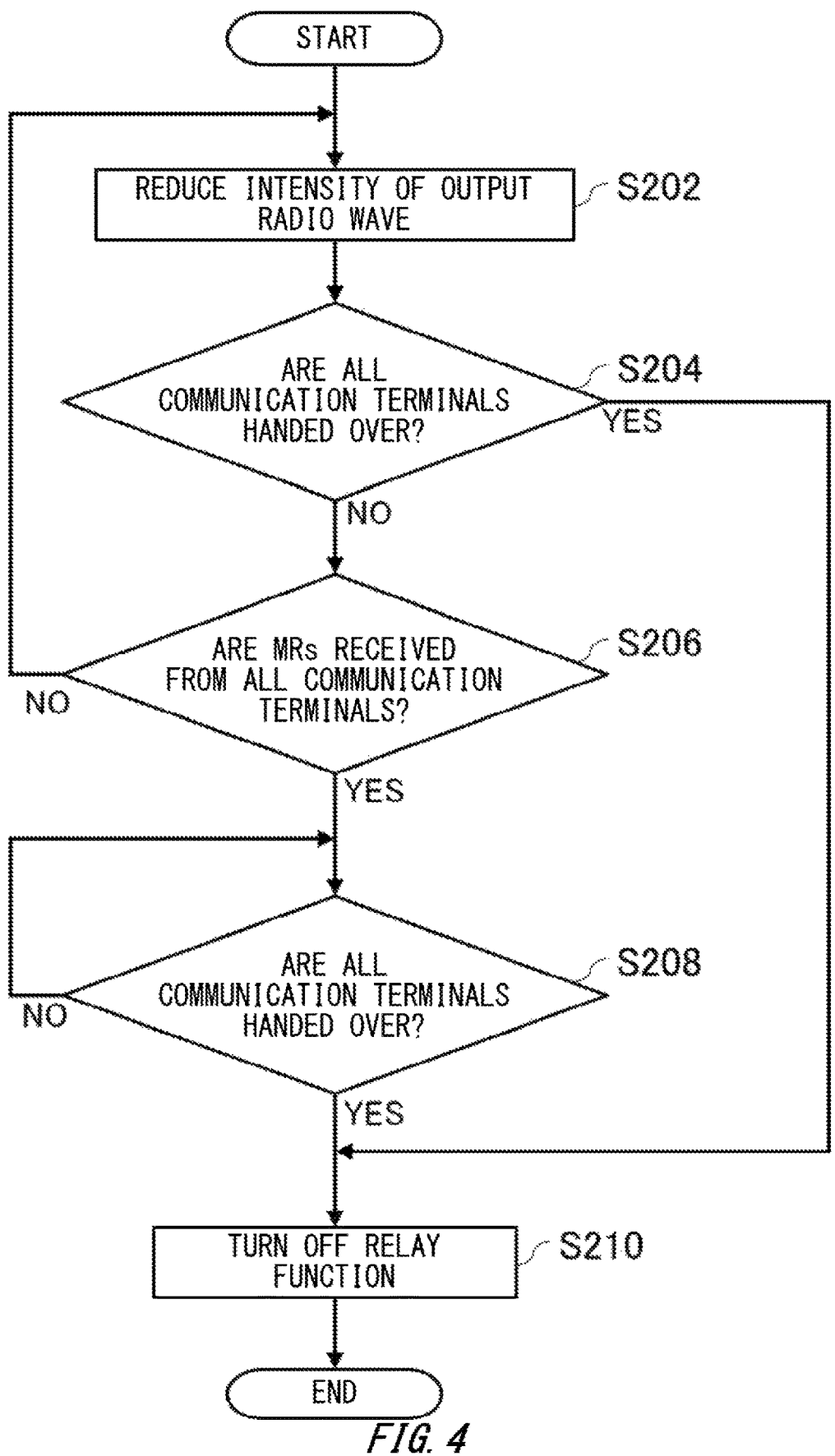
FIG. 4 is a diagram schematically illustrating an example of a processing flow of the relay device 210.

FIG. 4 is a diagram schematically illustrating an example of a processing flow of the relay device 210. Herein, a processing flow of the relay device 210 until the relay function is switched off in a case where the relay function is switched off will be schematically illustrated.

In S202, the radio wave intensity change unit 222 reduces the intensity of the output radio wave from the antenna 216. In S204, the radio wave intensity change unit 222 determines whether all the communication terminals 300 existing in the relay device 210 are handed over from the relay device 210. In a case where it is determined that all the communication terminals are handed over, the process proceeds to S210, and if not, the process proceeds to S206.

In S206, the radio wave intensity change unit 222 determines whether MRs are received from all the communication terminals 300 existing in the relay device 210. In a case where the MRs are received, the process proceeds to S208, and if not, the process returns to S202.

In S208, all the communication terminals 300 existing in the relay device 210 are on standby until being handed over from the relay device 210. In a case where all the communication terminals 300 existing in the relay device 210 are handed over from the relay device 210, the process proceeds to S210. In S210, the relay function management unit 220 turns off the relay function. Then, the process ends.

Figure 5:
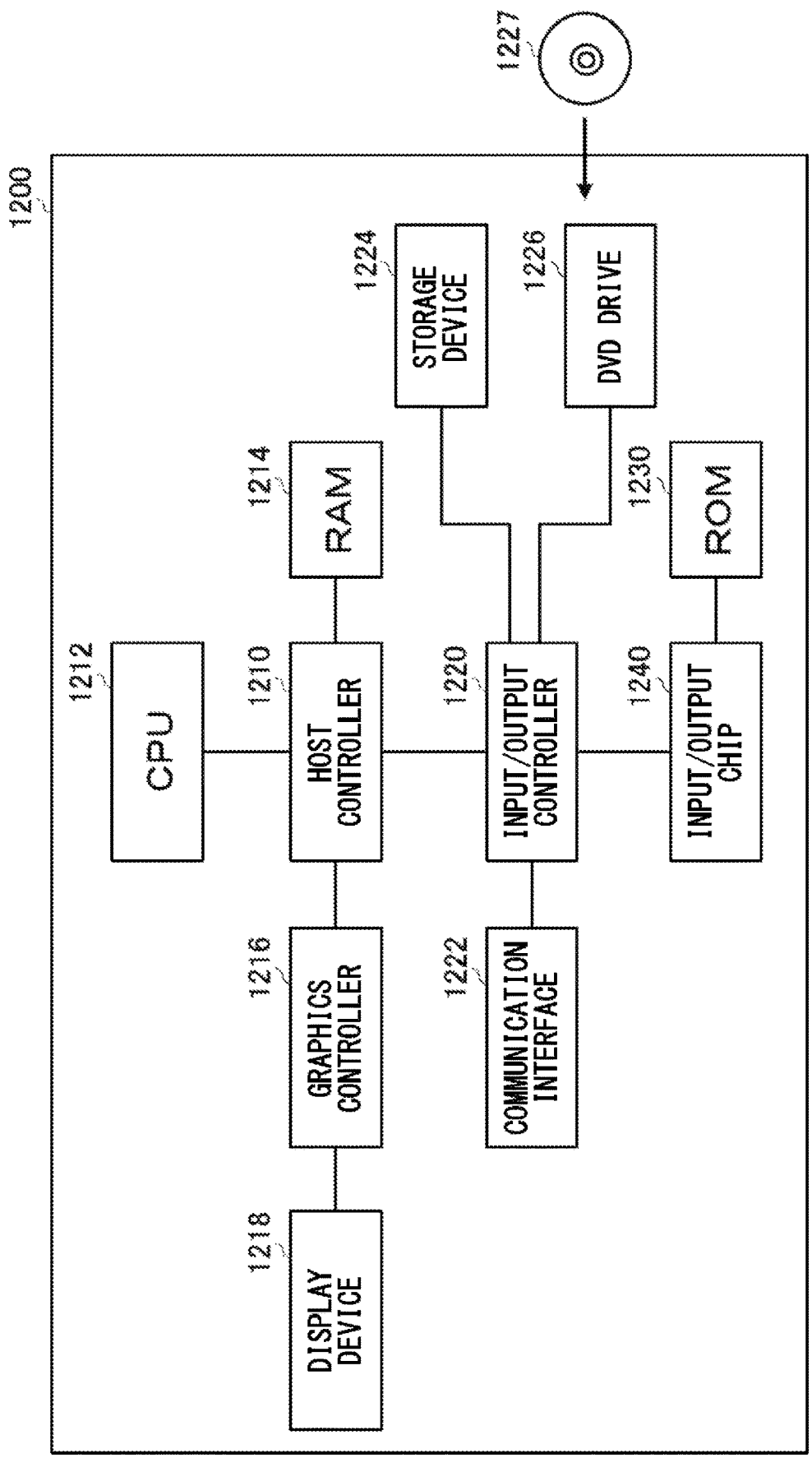
FIG. 5 is a diagram schematically illustrating an example of a hardware configuration of a computer 1200 serving as the relay device 210.

FIG. 5 is a diagram schematically illustrating an example of a hardware configuration of a computer 1200 serving as the relay device 210. A program installed in the computer 1200 can cause the computer 1200 to serve as one or more of "units" according to the embodiment, or cause the computer 1200 to perform the operation or the one or more of "units" associated with the device according to the embodiment, and/or can cause the computer 1200 to perform a process or steps of the process according to the embodiment. Such a program may be performed by a CPU 1212 in order to cause the computer 1200 to perform a specified operation associated with some or all of the blocks of the flowchart and the block diagram described in this specification.

The computer 1200 according to this embodiment includes the CPU 1212, a RAM 1214, and a graphics controller 1216, which are connected to each other through a host controller 1210. In addition, the computer 1200 includes input/output units such as a communication interface 1222, a storage device 1224, a DVD driver 1226, and an IC card drive, which are connected to the host controller 1210 through an input/output controller 1220. The DVD driver 1226 may be a DVD-ROM driver and a DVD-RAM drive. The storage device 1224 may be a hard disk drive and a solid state drive. In addition, the computer 1200 includes conventional input/output units such as a ROM 1230 and a touch panel, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on a display device 1218. The computer 1200 may not include the display device 1218, in which case the graphics controller 1216 causes the image data to be displayed on an external display device.

The communication interface 1222 communicates with other electronic devices via a wireless communication network. The storage device 1224 stores programs and data used by the CPU 1212 within the computer 1200. The DVD drive 1226 reads the programs or the data from the DVD-ROM 1227 or the like, and provides the storage device 1224 with the programs or the data. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port and the like to the input/output controller 1220.

A program is provided by computer readable storage media such as the DVD-ROM 1227 or the IC card. The program is read from the computer readable storage media, installed into the storage device 1224, RAM 1214, or ROM 1230, which are also examples of computer readable storage media, and executed by the CPU 1212.

The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive 1226 (DVD-ROM 1227), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable storage media on or near the computer 1200. In addition, a recording medium such as a hard disk or a RAM provided in a server system connected to a dedicated communication network or the Internet can be used as the computer readable storage media, thereby providing the program to the computer 1200 via the network.

Blocks in flowcharts and block diagrams in the above embodiments may represent steps of processes in which operations are performed or units of apparatuses responsible for performing operations. Certain steps and units may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, and memory elements, such as field-programmable gate arrays (FPGA), programmable logic arrays (PLA), etc.

Computer-readable storage media may include any tangible device that can store instructions for execution by a suitable device, such that the computer-readable storage medium having instructions stored therein comprises an article of manufacture including instructions which can be executed to create means for performing operations specified in the flowcharts or block diagrams. Examples of computer-readable storage media may include an electronic storage medium, a magnetic storage medium, an optical storage medium, an electromagnetic storage medium, a semiconductor storage medium, etc. More specific examples of computer-readable storage media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer-readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the descriptions of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 system
20 core network
22 MME
100 radio base station
102 wireless communication area
200 vehicle
202 wireless communication area
210 relay device
212 antenna
214 base station communication unit
216 antenna
218 terminal communication unit
220 relay function management unit
222 radio wave intensity change unit
224 estimation unit
300 communication terminal
1200 computer
1210 host controller
1212 CPU
1214 RAM
1216 graphics controller
1218 display device
1220 input/output controller
1222 communication interface
1224 storage device
1226 DVD driver
1227 DVD-ROM
1230 ROM
1240 input/output chip

What is claimed is:

1. A relay device for relaying communication between a radio base station and a communication terminal, comprising:
    a terminal communication unit which performs wireless communication with the communication terminal by an output radio wave from an antenna;
    a relay function management unit which switches on or off of a relay function for relaying communication between the radio base station and the communication terminal; and
    a radio wave intensity change unit which gradually reduces an intensity of the output radio wave from the antenna in a case where the relay function management unit switches off the relay function.

2. The relay device according to claim 1,
    wherein the radio wave intensity change unit gradually reduces the intensity of the output radio wave from the antenna until receiving information, which indicates a request of the communication terminal for a handover from the relay device, from the communication terminal which has established a wireless communication connection with the relay device.

3. The relay device according to claim 2,
    wherein the radio wave intensity change unit gradually reduces the intensity of the output radio wave from the antenna until receiving information, which indicates a request of the communication terminal for a handover from the relay device, from all of the communication terminals which have established a wireless communication connection with the relay device.

4. The relay device according to claim 1,
    wherein the radio wave intensity change unit gradually reduces the intensity of the output radio wave from the antenna until receiving a measurement report of a radio wave, which is received by the communication terminal, from the communication terminal which has established a wireless communication connection with the relay device.

5. The relay device according to claim 1,
    wherein the relay function management unit switches off the relay function after the radio wave intensity change unit gradually reduces the intensity of the output radio wave from the antenna and then the communication terminal is handed over from the relay device.

6. The relay device according to claim 5,
    wherein the relay function management unit switches off the relay function after the radio wave intensity change unit gradually reduces the intensity of the output radio wave from the antenna and then all of the communication terminals, which have established a wireless communication connection with the relay device, are handed over from the relay device.

7. The relay device according to claim 1,
    wherein the radio wave intensity change unit gradually reduces the intensity of the output radio wave from the antenna in a case where there is a communication terminal which has established a wireless communication connection with the relay device, and the relay function management unit is to switch off the relay function.

8. The relay device according to claim 1,
    wherein the radio wave intensity change unit increases a reduction amount in each stage in which the intensity of the output radio wave from the antenna is gradually reduced, as a radio wave reception intensity from the communication terminal, which has established a wireless communication connection with the relay device, becomes higher.

9. The relay device according to claim 1, wherein the radio wave intensity change unit decreases a reduction amount in each stage in which the intensity of the output radio wave from the antenna is gradually reduced, as a radio wave reception intensity from the communication terminal, which has established a wireless communication connection with the relay device, becomes lower.

10. The relay device according to claim 1, wherein the relay device is mounted in a moving body.

11. The relay device according to claim 10, further comprising:

an estimation unit which monitors a state of the moving body during a period when the relay function is on to estimate whether the relay function is to be turned off, wherein the radio wave intensity change unit gradually reduces the intensity of the output radio wave from the antenna when the estimation unit estimates that the relay function is to be turned off.

12. The relay device according to claim 11, wherein the estimation unit estimates that the relay function is to be turned off in a case where a moving speed of the moving body satisfies a predetermined condition.

13. The relay device according to claim 12, wherein the estimation unit estimates that the relay function is to be turned off in a case where the moving speed of the moving body is slower than a predetermined speed.

14. The relay device according to claim 11, wherein the estimation unit estimates that the relay function is to be turned off in a case where a power OFF operation of the moving body is detected.

15. The relay device according to claim 11, wherein the moving body is a vehicle, and wherein the estimation unit estimates that the relay function is to be turned off in a case where an ignition OFF operation of the vehicle is detected.

16. A non-transitory computer-readable storage media for storing a program, wherein the program causes the computer, which relays communication between a radio base station and a communication terminal, to function as:

a terminal communication unit which performs a wireless communication with the communication terminal by an output radio wave from an antenna, a relay function management unit which switches on or off a relay function for relaying communication between the radio base station and the communication terminal, and a radio wave intensity change unit which gradually reduces an intensity of the output radio wave from the antenna in a case where the relay function management unit switches off the relay function.

* * * * *